Dec. 11, 1956  C. E. HURLBURT ET AL  2,773,985
FREQUENCY SUBDIVIDER IN A FLUX VALVE COMPASS SYSTEM
Filed Dec. 17, 1952  2 Sheets-Sheet 1

INVENTORS
CHARLES E. HURLBURT
ROBERT H. DEAHL
BY S.K.Hartz
ATTORNEY

INVENTORS
CHARLES E. HURLBURT
ROBERT H. DEAHL
BY S. H. Hartz
ATTORNEY

United States Patent Office 2,773,985
Patented Dec. 11, 1956

2,773,985

FREQUENCY SUBDIVIDER IN A FLUX VALVE COMPASS SYSTEM

Charles E. Hurlburt and Robert H. Deahl, Bergen, N. J., assignors to Bendix Aviation Corporation, Teterboro, N. J., a corporation of Delaware Application December 17, 1952, Serial No. 326,550

2 Claims. (Cl. 250—36)

The invention relates to compass systems and, more particularly, to a compass system using a flux valve as a reference device.

A flux valve when energized by an alternating current source produces an output voltage having a frequency twice the frequency of the source. When the flux valve controls operation of a two-phase servomotor having its variable phase energized by the amplified output of the flux valve, it is necessary to provide a voltage having a frequency twice the frequency of the source for energizing the fixed phase of the motor. This is not always convenient and usually requires considerable electrical equipment.

One object of the present invention is to energize a flux valve of a compass system by an alternating voltage having a frequency of one-half the frequency of the power source so that the frequency of the output of the flux valve is the same as the power source.

Another object is to provide a frequency subdivider energized by the power source for providing a voltage having a frequency of half the frequency of the power source.

Another object is to provide a voltage subdivider for providing a sub-harmonic source frequency which utilizes a minimum number of components and wherein the frequency is automatically synchronized to the source frequency.

Another object is to provide a frequency subdivider using a single thyratron gas-filled tube.

The invention contemplates a compass system having a sub-harmonic network energized by an alternating power source and providing at its output a voltage having a frequency one-half the frequency of the power source, a flux valve transmitter connected to the output of the network, a receiver connected to the transmitter providing an error signal, a two-phase reversible motor having a fixed phase energized by the alternating power source and a variable phase energized in response to the error signal, a motor drivably connected to the receiver and driving the receiver to null position and an indicator drivably connected to the motor for indicating the heading of the craft on which the system is mounted. The frequency subdivider has a thyratron tube and a circuit tuned to a sub-harmonic frequency of the power source. In two of the embodiments the electron tube comprises a single thyratron discharge tube and in a third embodiment a conventional triode is used.

The foregoing and other objects and advantages of the invention will appear more fully hereinafter from a consideration of the detailed description which follows, taken together with the accompanying drawings wherein three embodiments of the invention are illustrated. It is to be expressly understood, however, that the drawings are for the purposes of illustration and description only, and are not to be construed as defining the limits of the invention.

In the drawings, Figure 1 is a schematic diagram showing a compass system having a flux valve energized by a frequency subdivider constructed according to one embodiment of the invention and utilizing a single thyratron tube.

Figure 1:
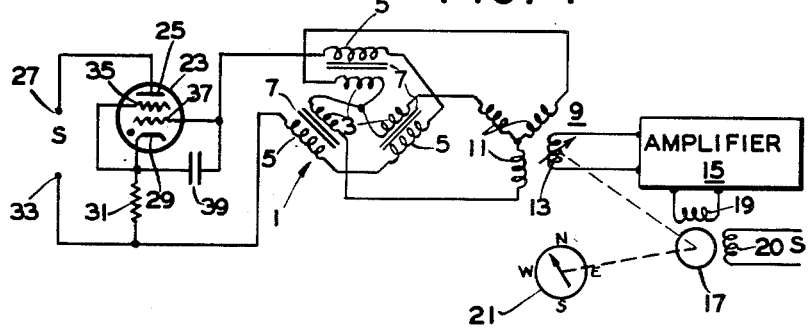

Referring now to the drawings for a more detailed description of the compass system including a novel frequency subdivider of the present invention, there is shown in Figure 1 a flux valve transmitter 1 having a pick-up winding 3 and an excited winding 5 wound on a triangular core 7 of highly permeable material. The flux valve may be stabilized in a horizontal plane by any suitable means (not shown).

A receiver inductive device 9 has a three-circuit stator winding 11 connected to pick-up winding 3 and a single phase rotor winding 13 inductively associated with the stator winding. The error signal between pick-up winding 3 of transmitter 1 and receiver 9 is applied to the input of an amplifier 15 connected to rotor winding 13 of receiver 9.

A two-phase motor 17 has its variable phase winding 19 connected to the output of amplifier 15 and its fixed phase 20 is energized by an alternating power source S. Motor 17 is drivably connected to a direction indicator 21 and to rotor winding 13 of receiver 9 and when an error signal appears across rotor winding 13, motor 17 is energized and drives rotor winding 13 to null position relative to flux valve 1, and indicator 21 indicates the direction in which the craft mounting the instrument is heading.

Excited winding 5 of transmitter winding 1 is energized by source S through a novel frequency subdivider circuit constructed according to the invention and comprising a single thyratron gas-filled tube 23 having its anode 25 connected to one terminal 27 of alternating power source S and its cathode 29 connected through a resistor 31 to the other terminal 33 of alternating power source S. Screen grid 35 of thyratron tube 23 is connected to cathode 29 and control grid 37 of the thyratron tube is connected through a condenser 39 to cathode 29. Excited winding 5 of transmitter 1 is connected in series with condenser 39 across resistor 31, and the excited winding and condenser are tuned to a frequency of one-half the frequency of the source.

Condenser 39 and excited winding 5 when energized resonate at a frequency of one-half the source frequency and provide a grid voltage for the thyratron of one-half the frequency of the source as shown in Figure 2b. Anode 25 is energized by the source as shown in Figure 2a and the thyratron passes current during alternate cycles for the half cycle when the anode is positive and the grid voltage is sufficiently positive to fire the tube. The tube cuts off when the anode voltage is negative and during alternate cycles when the anode is positive and the grid voltage is below cut-off and sufficiently negative to prevent the tube from firing.

Capacitor 39 has the dual purpose and function of tuning the excitation winding 5 to the submultiple frequency desired and coupling a portion of the voltage of the submultiple frequency to said grid to provide bias to cut off said electron tube on alternate half cycles of signals applied to the anode.

An undulating D. C. voltage as shown in Figure 2c appears across resistor 31 and the A. C. component is substantially the same as the grid excitation as shown in Figure 2b and appears across excited winding 5. The A. C. component has a frequency of one-half the frequency of source S. With this arrangement, the voltage of the frequency source energizing fixed winding 20 of motor 17 does not have to be doubled to correspond to the output of the flux valve because the frequency of the output of the flux valve is the same as the frequency of the power source. In the embodiment shown in Figure 1, only a single thyratron tube is required to subdivide the voltage from source S to energize excited winding 5 by an alternating current of one-half the frequency of source S.

Figure 3:
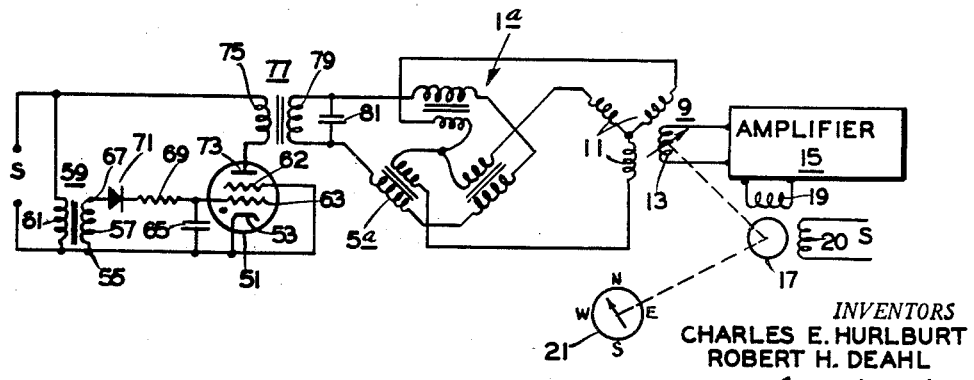
Figure 3 is a schematic wiring diagram of a compass system having a flux valve energized by a frequency subdivider constructed according to a second embodiment of the invention.

In Figure 3, the flux valve compass system is substantially the same as in Figure 1 and excited winding 5a of flux valve transmitter 1a is energized through a frequency subdivider circuit at a frequency of one-half the frequency of source S. The frequency subdivider of Figure 3 comprises a single thyratron gas-filled tube 51 with its cathode 53 connected to one terminal 55 of the secondary winding 57 of a transformer 59 having its primary winding 61 connected across alternating power source S. Screen grid 62 of thyratron 51 is connected directly to cathode 53 and control grid 63 is connected to cathode 53 through a condenser 65 and to the other terminal 67 of secondary winding 57 of transformer 59 through a resistor 69 and a rectifier 71. Anode 73 of thyratron 51 is connected through the primary winding 75 of a transformer 77 to alternating power source S.

Secondary winding 79 of transformer 77 is connected in series with excited winding 5a of transmitter 1a. A condenser 81 is connected across secondary winding 79 of transformer 77 in parallel with excited winding 5a, and the condenser and excited winding provide a circuit tuned to a frequency of one-half the frequency of source S.

Figure 4:
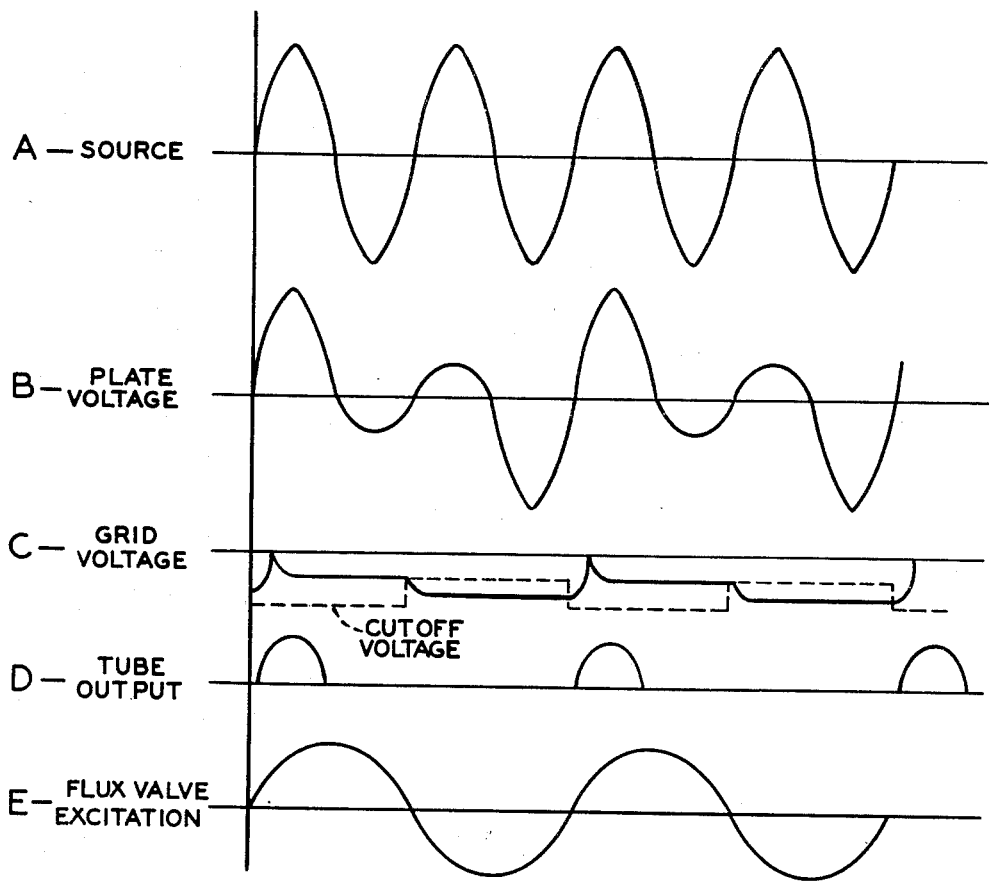
Figure 4 shows the relationship of the source, anode, and control grid voltages of the thyratron tube of the frequency subdivider circuit, shown in Figure 3, and the resulting sub-harmonic output of the circuit and excitation of the flux valve.

The source voltage shown in Figure 4a is applied to anode 73 through primary winding 75 of transformer 77 and the anode is energized, as shown in Figure 4b. The difference in amplitude between alternate cycles of anode voltage is caused by feedback from tuned L. C. circuit 79, 81 through transformer 77 when tube 51 conducts. As indicated above, L. C. circuit 79, 81, 5a is tuned to a frequency of one-half the frequency of source S and the feedback voltage from the tuned circuit adds algebraically to the source voltage and increases the anode voltage during alternate cycles and decreases the anode voltage during intermediate alternate cycles.

The source voltage is applied also through step-down transformer 59, rectifier 71, resistor 69 and condenser 65 to grid 63. Transformer 59 is wound to apply a potential of reverse phase to grid 63 relative to the plate voltage. Rectifier 71 passes negative grid voltages and clips off positve grid voltages.

A gradually decreasing negative potential is applied to grid 63, as shown in Figure 4c which is determined by the voltage across transformer 59, and the values of resistor 69 and condenser 65. The cut-off voltage of the thyratron changes with the change in anode excitation, as shown in Figure 4c. During the first half cycle of the source voltage, the cut-off value of grid voltage is indicated by the dotted line in Figure 4c and, during this time, the grid voltage is above this value and the tube conducts.

During the second half cycle of the source voltage anode 73 is negative and the tube does not conduct during this half cycle. During the first half of the second cycle, the negative grid potential increases further because of the accumulated charge on condenser 65 and the grid voltage falls below the cut-off value of the tube for the decrease voltage applied to the anode during this cycle. During the last half of the second cycle the tube does not conduct because the plate voltage is negative.

In the first half of the third cycle, the cut-off voltage becomes more negative for the increased anode voltage and the grid voltage now permits the tube to conduct, whereupon the charge on grid 63 leaks off through the latter and the tube begins another cycle corresponding to the first cycle and then repeats its operation. The output of the thyratron is shown in Figure 4d. After being applied to tuned circuit 79, 81, 5a, the voltage across excited winding 5a of transmitter 1a is an alternating voltage having a frequency of one-half the source frequency substantially as shown in Figure 4e.

Figure 2:
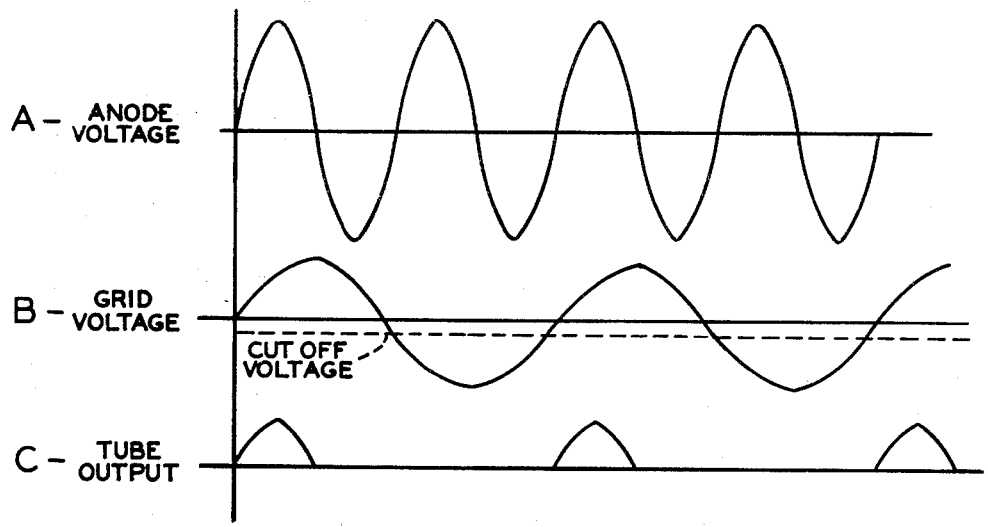
Figure 2 shows the relationship of the voltages applied to the anode and control grid of the thyratron tube used in the frequency subdivider circuit of Figure 1, and the resulting sub-harmonic output of the circuit.
Figure 5:
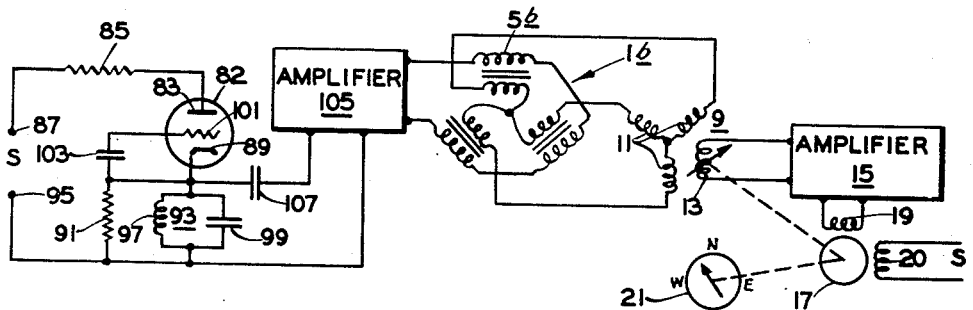
Figure 5 is a schematic diagram of a compass system using a sub-harmonic generator constructed according to a third embodiment of the invention.

In Figure 5 the flux valve compass system is substantially the same as in Figures 1 and 2 and excited winding 5b of flux valve transmitter 1b is energized through a frequency subdivider circuit at a frequency one-half the frequency of source S. The frequency subdivider of Figure 5 uses a conventional triode vacuum tube 82 having its anode 83 connected through a resistor 85 to one terminal 87 of source S. Cathode 89 of tube 82 is connected through a resistor 91 and a tuned L. C. circuit 93 in parallel therewith to the other terminal 95 of source S. The tuned circuit 93 comprises an inductance 97 and condenser 99 tuned to a frequency of one-half the frequency of source S. Grid 101 of tube 81 is connected through a condenser 103 to cathode 89.

The relationship of the anode, grid and output voltages is substantially the same as shown in Figures 2a, 2b and 2c, respectively, as described in connection with Figure 1. Anode 83 is energized by source S substantially as shown in Figure 2a and the tube passes current during alternate cycles for the half cycle when anode 83 is positive and the grid voltage is sufficiently positive to provide for conductance of the tube. The tube cuts off when the anode voltage is negative and during alternate cycles when the anode is positive and the grid voltage is below cut off. An undulating D. C. voltage, as shown in Figure 2c, appears across resistor 91. An amplifier 105 has its input connected through a condenser 107 across resistor 91 and the output of the amplifier energizes winding 5b of the transmitter. An A. C. component substantially the same as the grid excitation, as shown in Figure 2b, energizes excited winding 5b.

Although but three embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A frequency subdivider providing an output signal having a frequency which is a submultiple of the frequency of the signal applied to the input of said subdivider, said subdivider including a dual purpose capacitor, an electron discharge device having at least a grid, cathode and anode, and an inductance, said dual purpose capacitor being coupled to said inductance to provide a circuit tuned to the desired submultiple frequency and being connected between said grid and cathode to provide negative voltage to cut off said electron discharge device on alternate cycles of the input signal voltage applied to the anode, said inductance also forming part of said tuned circuit and providing an output circuit of said frequency subdivider.

2. In a compass system utilizing a flux valve reference including an excitation winding, a frequency subdivider providing an output signal having a frequency which is a submultiple of the frequency of the signal applied to the input of said subdivider, said subdivider including an electron tube having at least a grid, a cathode and an anode, and a single capacitor having the dual function of tuning said excitation winding to the submultiple frequency desired and coupling a portion of the voltage of the submultiple frequency to said grid to provide bias to cut off said electron tube on alternate half cycles of signals applied to the anode.

References Cited in the file of this patent

UNITED STATES PATENTS

| | | |
|---|---|---|
| 1,933,970 | Curtis | Nov. 7, 1933 |
| 2,439,701 | Stuart | Sept. 2, 1944 |
| 2,403,559 | Seeley | July 9, 1946 |
| 2,445,161 | Vogel | July 13, 1948 |
| 2,506,186 | Wittenberg | May 2, 1950 |
| 2,495,726 | Houghton | Jan. 31, 1950 |
| 2,611,190 | MacCallum et al. | Sept. 23, 1952 |